United States Patent [19]

Nishikawa

[11] 4,248,517

[45] Feb. 3, 1981

[54] ILLUMINATING DEVICE FOR USE IN A COPYING APPARATUS, A FACSIMILE APPARATUS, AND THE LIKE

[75] Inventor: Masaji Nishikawa, Hachiaji, Japan

[73] Assignee: Olympus Optical Company Ltd., Tokyo, Japan

[21] Appl. No.: 974,653

[22] Filed: Dec. 22, 1978

[30] Foreign Application Priority Data

Dec. 28, 1977 [JP] Japan ............................. 52-157438

[51] Int. Cl.³ ............................................ G03B 27/00
[52] U.S. Cl. ........................................ 355/1; 313/117; 355/71; 362/16
[58] Field of Search ............................. 355/1, 67–71, 355/8, 11; 313/110, 117; 362/3, 8, 16

[56] References Cited

U.S. PATENT DOCUMENTS

| | | | |
|---|---|---|---|
| 3,914,049 | 10/1975 | Basu et al. | 355/68 |
| 3,947,106 | 3/1976 | Hamaguchi et al. | 355/67 X |
| 3,977,777 | 8/1976 | Tanaka et al. | 355/70 X |
| 4,124,295 | 11/1978 | Gardiner | 355/68 |

Primary Examiner—Richard A. Wintercorn
Attorney, Agent, or Firm—Haseltine and Lake

[57] ABSTRACT

An illuminating device for use in a copying apparatus, a facsimile apparatus, and the like in which a document is illuminated and imagewise exposure of the illuminated document is effected comprises an illuminating fluorescent lamp having an elongated tube, and a mask having a plurality of apertures formed therein, whereby the mask is provided around the tube in closely contact therewith and extending substantially over the whole length of the tube and said openings are so configurated that the document is illuminated with a uniform light distribution.

6 Claims, 11 Drawing Figures

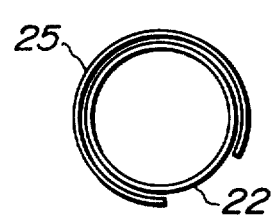
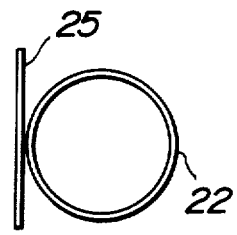
Fig. 5A. Fig. 5B.
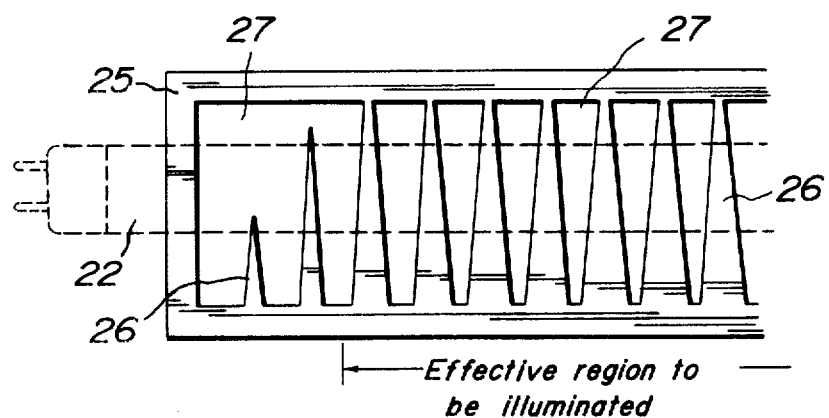
Fig. 6.
Effective region to be illuminated

ILLUMINATING DEVICE FOR USE IN A COPYING APPARATUS, A FACSIMILE APPARATUS, AND THE LIKE

BACKGROUND OF THE INVENTION

The invention relates to an illuminating device for use in a copying apparatus, a facsimile apparatus and the like in which imagewise exposure of an illuminated document is effected.

For example, in a copying apparatus an illuminating device comprising an elongated illuminating lamp is generally used and an optical image of a document illuminated by the lamp is projected on a photosensitive body such as a photoconductive body by means of an optical projecting system comprising a single lens system of a long focal length. In such an apparatus means for adjusting an amount of exposure light on the photoconductive body is usually provided. For instance, mechanical means such as a shutter or diaphragm mechanism is provided in the optical path of the optical projecting system and can be adjusted from outside. Also in a one shot exposure apparatus in which the document image is wholly projected on the photoconductive body by a single exposure, electrical means for adjusting an exposure time of the illuminating lamp has been practically used. However, the mechanical means for adjusting an amount of exposure light is complicated in construction and control so that a reliable operation and a high freedom for design are not obtained. Further, when as the illuminating lamp use is made of a discharge lamp such as a fluorescent lamp and the like, the document could not be illuminated uniformly at a desired light intensity, because the lamp shows a decrease in light intensity at its end portions and also produces an evenness of illumination due to the cyclic lighting of the lamp in accordance with a cycle of a supply voltage. Therefore, if the one shot exposure is effected by adjusting the exposure time, it is also impossible to uniformly illuminate the document with the desired distribution of hight.

Further, an illuminating device for imagewise exposure has been proposed in which use is made of an array of convergint type optical fibers as the optical projecting system. In a device of this kind, a good projecting property can be obtained by arranging the converging type optical fiber array having a length, for example, of 30 mm between the photoconductive body and the document in such manner that a distance from incident and exit surfaces of the array to the document and to the photoconductive, respectively is about 15-20 mm. This means that the space for the illuminating device and the projection system can be made very small and hence the whole copying apparatus can be made small in size. However, in such a device, the dimension in the scanning direction of those portions on the photoconductive body and the document which are scanned at a time is small, for example about 5 mm, whereas the width of the document or record paper is large, for example about 210 mm in A4 size or letter size and about 280 mm in B4 size, so that an extremely elongated area on the photoconductive body is exposed at a time. Thus, in order to adjust an amount of exposure light in this device the dimension of the elongated exposure area in the scanning direction must be controlled in a narrow space. To this end, it has been proposed in Japanese Utility Model Laid Open Publication No. 87,932/75 to insert a diaphragm in symmetry with respect to the optical fiber array and to adjust an amount of exposure light by adjusting the diaphragm without producing an unevenness of exposure light. Further it has been proposed in Japanese Utility Model Laid Open Publication No. 73,438/75 to use a slit type fluorescent lamp as the illuminating lamp and to adjust the illuminating light by rotating the lamp about its longitudinal axis. However, since the space for arranging the device is very small, in particular the former mechanical means is more complicated in construction and control than the previously stated optical projecting system having a single lens system and thus it is very difficult to maintain effectively a required accuracy and it is impossible to obtain a reliable operation and a high freedom for design. Further, when a fluorescent lamp is used as the illuminating lamp and energized by A.C. supply source, an intensity of light emitted from the lamp varies cyclically in synchronism with the A.C. supply voltage. As a result in case of narrow exposure light an unevenness of illumination in stripe-pattern is produced in the scanning direction in accordance with the cyclically changing light intensity of the lamp. This problem also occurs in case of adjusting an amount of exposure light by rotating the slit type fluorescent lamp. Therefore, in both cases it is necessary to take a measure, for example to operate the fluorescent lamp at higher frequency in order to eliminate the unevenness of illumination.

Further, in the copying apparatus and the like the illuminating device is required to have such a function that an amount of exposure light can be automatically determined by detecting the density of a background of the document and an amount of light from the illuminating lamp, that an amount of exposure light can be corrected in accordance with the number of repeatedly used times of the photosensitive body so as to avoid the influence of the fatigue of the photosensitive body and that an amount of exposure light can be adjusted so as to correct a non-uniformity of light intensity of the illuminating lamp due to its aging. Such a function can be achieved by electrical dimmer means for adjusting electrically the light intensity of the illuminating lamp without using the above stated mechanical means for adjusting an amount of exposure light. However, in this case if the illuminating lamp is a discharge lamp such as a fluorescent lamp energized by A.C. supply source, an unevenness of illumination as stated above is also produced in an area to be illuminated on the document or an exposure area on the photoconductive drum.

SUMMARY OF THE INVENTION

An object of the invention, therefore, is to solve the above mentioned problems and to provide an illuminating device for imagewise exposure which can illuminate an area on a document with desired illumination distribution by an elongated illuminating lamp.

According to the invention an illuminating device for use in a copying apparatus, a facsimile apparatus, and the like in which a document is illuminated and imagewise exposure of the illuminated document is effected comprises an illuminating lamp having an elongated tube, and a mask having a plurality of light permeable openings formed in the mask, whereby the mask is arranged in closely contact with or in adjacent to the tube over the length of the tube and said openings are so configurated that the document is illuminated with a desired light distribution.

It is another object of the invention to provide an illuminating device for use in an apparatus comprising an array of converging type optical fibers, which can illuminate a document with a desired illumination distribution without using mechanical means for adjusting an amount of exposure light and hence is simple in construction.

According to the invention an illuminating device for use in a copying apparatus, a facsimile apparatus and the like which comprises an array of converging type optical fibers through which imagewise exposure of an illuminated document is effected comprises an illuminating lamp having an elongated tube and a mask having a plurality of light permeable openings and arranged in closely contact with or in adjacent to the lamp tube over the length of the lamp tube, whereby the openings in the mask are so configurated that the document is illuminated with a desired illumination distribution, said illuminating device further comprising a dimmer circuit for adjusting the light intensity of said lamp.

BRIEF DESCRIPTION OF THE DRAWINGS

FIGS. 5A and 5B show different arrangements of the mask;

FIG. 6 is a front view of a part of an another embodiment of the illuminating device according to the invention;

DESCRIPTION OF THE PREFERRED EMBODIMENTS

Figure 1:
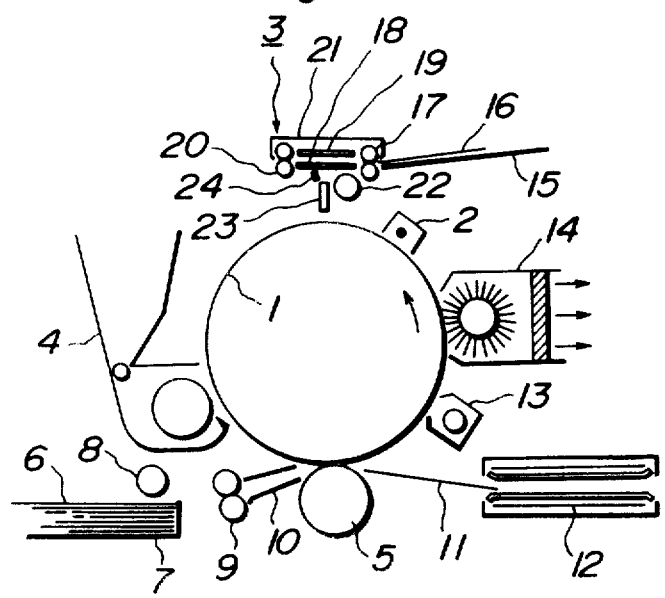
FIG. 1 is a diagrammatic view showing a construction of an electrophotographic apparatus comprising an illuminating device according to the invention.

FIG. 1 shows diagrammatically an embodiment of an electrophotographic apparatus to which an illuminating device for imagewise exposure according to the invention may be applied. In this electrophotographic apparatus a series of duplicating steps are carried out while a photoconductive drum 1 is rotated in a direction shown by an arrow. The drum 1, at first, is uniformly charged in either positive or negative by a corona charging device 2 which is arranged in vicinity of the drum 1 and then illuminated with a light image corresponding to a document image by means of an illuminating device 3, which will be described hereinafter, to form on the drum an electrostatic latent image corresponding to the light image. The latent image thus formed on the drum 1 is developed with toners by means of a development device 4, the toners being charged or energized in opposite polarity to the charging polarity of the charging device 2. Then the toner image thus obtained is transferred onto a record paper travelling between the drum 1 and a bias transfer roller 5 which is arranged in contact with or in close to the drum.

The record papers 6 are stuck in a cassette 7 and are drawn out one by one by means of a pickup roller 8 in synchronism with the rotation of the drum 1 and fed between the drum 1 and the transfer roller 5 by means of a pair of paper feed rollers 9 and a paper feed guide 10. When the paper passes between the drum 1 and the transfer roller 5, the transfer of toner image onto the paper is effected. The paper on which the toner image has been transferred is torn off from the drum 1 and transported through a paper feed guide 11 to a fixation device 12, in which the toner is fussed and fixed on the paper to form a hard copy, thereafter the paper is discharged on a tray (not shown). After the toner image on the drum 1 has been transferred onto the paper, the residual latent image on the drum 1 is erased by means of a charge erasing lamp 13 and then the residual toners on the drum 1 are removed by means of a cleaning device 14 and thus a preparation for next latent image formation is completed. When a plurality of hard copies are to be formed from a single and same latent image once formed on the drum, the erasing lamp 13 and the cleaning device 14 are operated only after the developement and transfer steps have been repeated by a given number of times.

Figure 2:
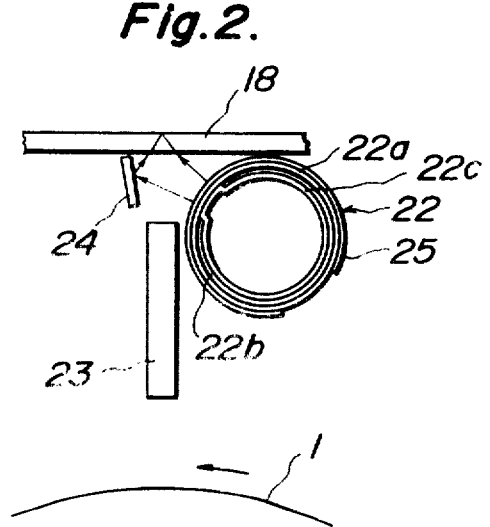
FIG. 2 is an enlarged view of the device shown in FIG. 1.

The illuminating device 3 shown in FIG. 1 is so constructed that a document is fed by a sheet feed mechanism, during which the document is optically scanned. That is, the document 16 laid on a document table 15 is fed by a pair of document feed rollers 17 between a transparent glass plate 18 and a reflecting plate 19 have a diffused reflection surface of white color and arranged opposite to the upper surface of the transparent glass plate 18. While the document 16 is fed between the rollers 17 it is optically scanned. The document is discharged by a pair of document discharge rollers 20 onto a document receiving tray (not shown). A cover 21 extending between the document feed rollers 17 and the document discharge rollers 20 is provided for preventing the external light from entering into the apparatus. An elongated illuminating lamp 22 is arranged below the glass plate 18 in a direction perpendicular to the feed direction of the document. In this embodiment, as the illuminating lamp use is made of a slit type fluorescent lamp as shown in FIG. 2 which shows an enlarged view of an illuminating and projecting optical system of this embodiment, the discharge current of which lamp is selected to a large value to produce an output having a high brightness, while the reflected light (optical image) from the area of the document illuminated by the lamp is projected onto the photoconductive drum 1 through an optical projecting system formed by an array of converging type optical fibers 23 which is arranged in a direction perpendicular to the feed direction of the document. Further, in this embodiment, a reflecting mirror 24 is arranged at the side of the projecting optical path opposite to the illuminating lamp 22 and is inclined in such manner that the light from the illuminating lamp 22 is reflected on the area to be illuminated of the document. Thus the area to be illluminated of the document effectively illuminated with the direct light from the lamp 24 and the reflected light from the reflector 24. The slit type fluorescent lamp 22 used in this embodiment comprises an elongated glass tube 22a, the inner wall of which is coated with a reflecting material 22b except for a slit portion extending in the longitudinal direction and further coated completely with a fluorescent material 22c.

Figure 3:
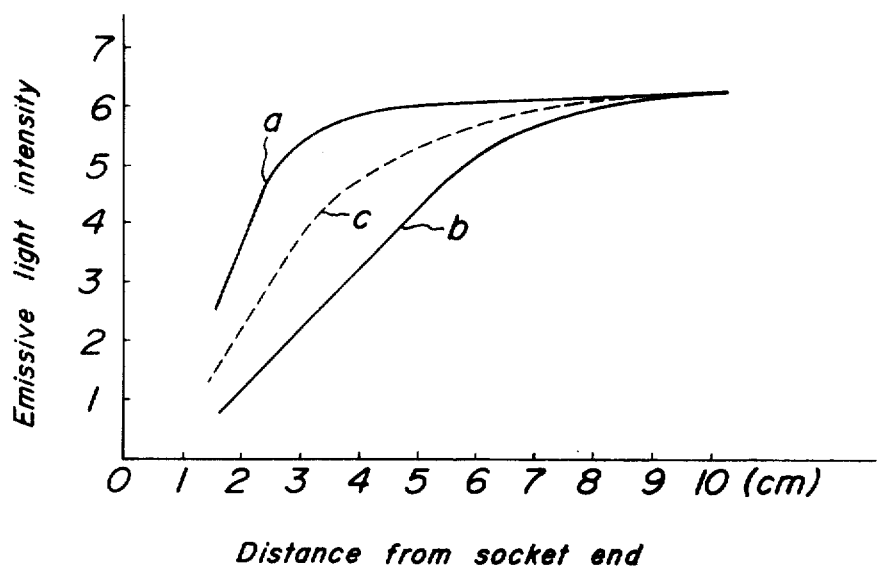
FIG. 3 is a graph showing emissive light intensities of a fluorescent lamp at negative and positive polarities of A.C. supply voltage thereof.

However, as described hereinbefore the slit type fluorescent lamp 22 has phenomena of decreasing the light emissive amount at its end portions and of changing the light emissive amount in accordance with the change in polarity of discharge at each half cycle of the A.C. supply voltage. An example of such phenomena is shown in FIG. 3. FIG. 3 is a graph illustrating a light emissive amount of a 15 W fluorescent lamp having a diameter of 25 mm as a function of a distance from its socket end. In this graph full line curves a and b indicate the light amounts emitted during one half cycle and the other half cycle of the A.C. supply voltage, respectively. The effective light intensity of this lamp may be considered to be a mean vlaue of the values a and b which is shown by a dotted line curve c. As can be seen from FIG. 3, the lamp shows a considerable decrease in light emissive amount at the end portion up to 8 cm from the socket end as compared with the central portion thereof. Therefore, the end portions of the lamp could not be used as an effective light source. Further, if a longer fluorescent lamp is used so as not to use its end portions as the light source, the fluorescent lamp projects beyond the other parts of the apparatus, which is very inconvenient for design of the apparatus.

Figure 4:
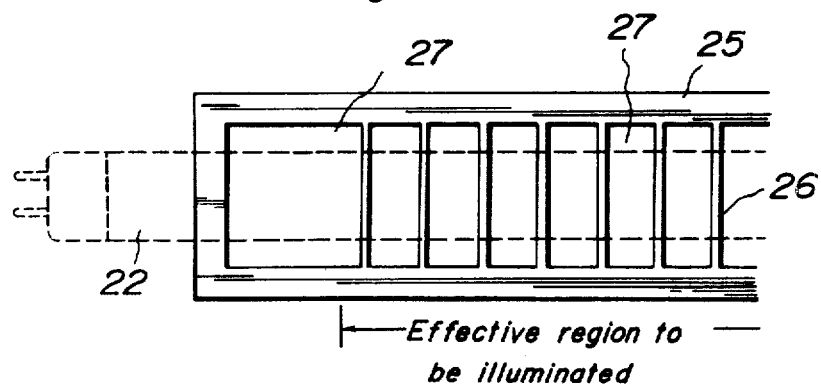
FIG. 4 is a developed view of the mask shown in FIG. 2.

Therefore, in this embodiment in order to prevent the undesired phenomena of the fluorescent lamp as described above, a mask having a plurality of apertures formed therein is provided around the tube of the lamp 22 in closely contact therewith and extending substantially over the whole length of the lamp 22. This mask 25, as shown in FIG. 4 by a developed view, has a plurality of apertures defined by grids 26 for shielding the light, which apertures have different areas between at the end and center portions of the mask corresponding to the end and center portions of the lamp. That is the apertures at the end portion have large area so as to shield small amounts of light and the apertures at the center portion have small area so as to shield large amounts of light. Such a variation in area of the apertures between at the end and center portions of the lamp can easily be achieved by varying the widths of the grids 26 or pitches between the grids in such manner that the pitches of grids 26 are made large at the end portion and small at the center portion. In this case the smaller the pitches or widths of the grids 26, the more a small and local unevenness of illumination can be prevented. When the distance to the area to be illuminated on the document is large, the pitches and widths of the grids can be made large, but when said distance is small, the pitches and widths should be made small. Generally, the pitches of the grids 26 are desired to be smaller than half the distance to the area to be illuminated on the document. The mask 25 can be manufactured by either an opaque or translucent member, for example a black paper, plastic, metal, etc. More particularly, if the mask 25 is manufactured by a metal, the mask can be used as a grounded electrode for stabilizing the discharge of the lamp.

The mask 25 described above which is provided around the tube of the lamp 22 in closely contact therewith may be secured on the lamp tube by means of an adhesive. In addition, the mask may be formed by a resilient tubular member having a diameter smaller than that of the lamp tube in which member the lamp is resiliently inserted or may be provided by printing the mask on the lamp tube surface. Further, instead of providing the mask around the lamp tube in closely contact therewith, the mask may be coaxially arranged around the lamp tube with a larger diameter than that of the lamp tube as shown in FIG. 5A or a flat mask may be arranged in adjacent to the lamp tube as shown in FIG. 5B. In this case, the same effect can be obtained, but if the mask is not sufficiently close to the lamp tube, a local unevenness of illumination might be produced.

It is apparent from the above that if the mask 25 having apertures 27 which decreases an amount light at the center portion of the lamp 22 so as to compensate the decrease in amount of light at the end portions of the lamp 22 is arranged in closely contact with or in adjacent to the lamp tube, the area to be illuminated can be illuminated with a uniform or desired light distribution.

FIG. 6 shows a front view of another embodiment of the illuminating device for imagewise exposure according to the invention, in which the mask 25 can be displaced individually or together with the slit type fluorescent lamp 22 and the intensity of illumination at the area to be illuminated can be adjusted by displacing the mask 25. To this end, in this embodiment the apertures 27 of the screen 25 are formed in such a shape that the light amounts passing through the apertures are gradually changed in accordance with the positions along the circumferential direction of the lamp 22. This mask can also be manufactured and arranged in the same manner as described with reference to FIGS. 4 and 5A, 5B and further may be formed so as to compensate the decrease in light amount at the ends of the lamp. The adjustment of an amount of light on the area to be illuminated, that is an amount of exposure light by means of such a mask 25 can be effected by rotating the mask 25 together with the lamp 22 or by displacing the mask 25 in the circumferential direction of the lamp while the lamp is fixed. The former measure can be effectively used in the case that the screen 25 is provided around the lamp tube in closely contact therewith as shown in FIG. 2 or arranged coaxially around the lamp tube as shown in FIG. 5A and the latter measure can be effectively used in the case that the screen 25 is movably arranged with respect to the lamp as shown in FIGS. 5A and 5B. Therefore, if the displacement of the mask 25 is controlled in accordance with the density of background of the document, the variation in light amount of the lamp or the number of repeatedly used times of the photosensitive drum so as to correct the fatigue thereof, a correct exposure can be obtained.

Figure 7A:
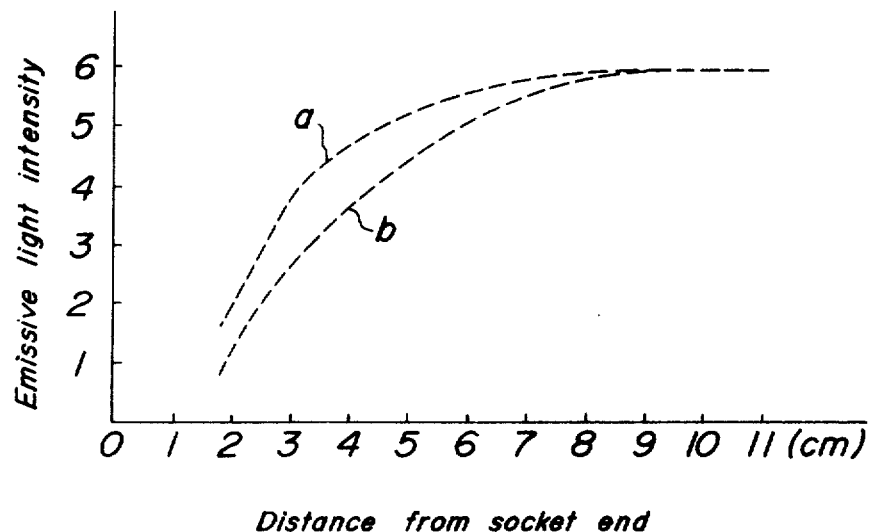
FIG. 7A is a graph showing emissive light distributions of new and aged fluorescent lamps.
Figure 7B:
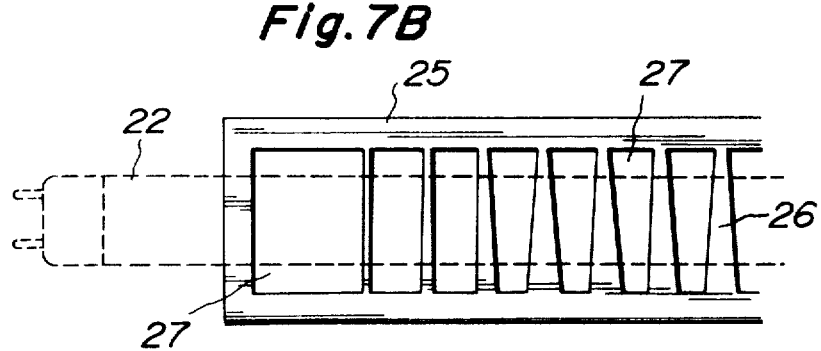
FIG. 7B is a front view of a part of still another embodiment of the illuminating device according to the present invention.

FIG. 7A is a graph illustrating emissive light distribution curves a and b of a new fluorescent lamp and an aged fluorescent lamp, respectively. The emissive light intensities indicated by curves a and b represent effective values like as the curve c in FIG. 3. As apparent from this graph, the aged fluorescent lamp shows larger decrease in light amount at its end portions. FIG. 7B is a front view of still another embodiment of the illuminating device according to the invention in which a variation of emissive light distribution of the lamp due to the aging as shown in FIG. 7A can be corrected by the mask. To this end, in this embodiment the apertures of the mask 25 are so configurated that the areas of the apertures at the end portion become large and those at the center portion become small in accordance with the emissive light distribution characteristic of the aged lamp as shown in FIG. 7A and further the apertures at the center portion are so configurated that the amounts of light passing through the apertures are varied in accordance with the positions along the circumferential direction of the lamp 22 as in FIG. 6. Further, this mask 25 is arranged in displaceable manner as in FIG. 6 and the displacement of the mask is controlled in accordance with the variation of the emissive light distribution of the lamp due to the aging so as to correct the variation in amount of exposure light. In this case, this mask 25 can also be manufactured and arranged in the same manner as described with reference to FIGS. 4 to 6.

Figure 8:
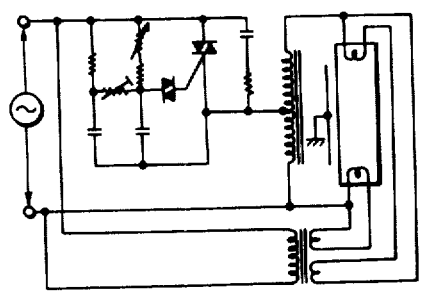
FIGS. 8 and 9 show electric circuit diagrams of dimmer circuits which may be used in the device according to the invention.
Figure 9:
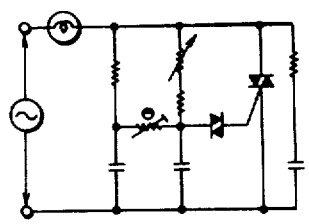

According to the illuminating device shown in FIGS. 6 and 7B the area to be illuminated can be illuminated with a desired amount of light by appropriately displacing the mask 25. However, in the illuminating device using the converging type optical fiber array as the projecting optical system as shown in FIGS. 1 and 2, since the setting space is very small, it is preferred, in view of a reliability of operation and an easiness for control, etc., to provide an electrical dimmer circuit in the lighting circuit of the lamp so as to adjust the emissive light intensity of the lamp itself rather than to displace the mask so as to adjust the amount of light. Therefore, if in the above embodiment the dimmer circuit is provided in the electric circuit of the slit type fluorescent lamp 22, the mask 25 is not necessarily displaceable. Moreover, as the dimmer circuit, known circuits described for example in a Japanese book, "Transistor Technique" July 1975 can be used. FIGS. 8 and 9 show the dimmer circuits for fluorescent lamp and for incandescent lamp described therein, respectively. If such a dimmer circuit is controlled automatically in accordance with the density of the background of the document, the light intensity of the light source, and the fatigue of the drum, etc. in addition to provide mask 25 around the lamp tube so as to illuminate the area to be illuminated with a desired distribution, a desired amount of illumination light can be always obtained even if the fluorescent lamp is used.

As described above, according to the invention a uniformity of light intensity of a fluorescent lamp due to the decrease in light amount at its ends can effectively be corrected and a correction for a uniformity of light intensity of the fluorescent lamp due to the aging and an appropriate adjustment of an illumination intensity can be effected. Further, in the illuminating device comprising the converging type optical fiber array as the projecting optical system, the document can be illuminated with a desired distribution of light and the light intensity of the lamp can adjusted by the electrical dimmer circuit, as a result of which the document can be always illuminated with a desired amount of light and further the device can be constructed in compact as a whole.

The invention is not limited to the embodiments described above, but many modifications may be conceived by those skilled in the art within the scope of the invention. For example, as the illuminating lamp, in addition to the slit type fluorescent lamp, ordinary fluorescent lamps and incandescent lamps such a halogen lamp, etc. can be used. Further, although the mask 25 in the above embodiments is formed by the light shielding member having the apertures 27 defined by the grid 26, the mask may be formed by printing opaque materials in any shape such as dots or opaque layer having apertures in any shape on the outer surface of the lamp tube or a separate transparent sheet. Such a mask is suitable for the device comprising the converging type optical fiber array in which the space for the mask and the lamp is very narrow. Further, the present invention may be applied to a document illuminating device in a facsimile and to all fields in which a uniform illumination or adjustment of high intensity is required. Further, the invention may be applied to the case in which the required illumination distribution is a particular non-uniform distribution which cannot be obtained by only a fluorescent lamp, for example the case in which a decrease in light amount at periphery of a projecting lens is required to be corrected. Further, when a desired illumination distribution is obtained by using only the mask without using the electric dimmer circuit, as the projecting optical system use may be made of any other optical systems such as a single lens system etc. than the converging type optical fiber array.

What is claimed is:

1. An illuminating device for use in a copying apparatus, a facsimile apparatus and the like in which a document to be scanned is illuminated and imagewise exposure of the illuminated document is effected to an electrophotographic photosensitive member by means of an array of converging type optical fibers comprising:

a fluorescent lamp having an elongated tube and a slit like aperture through which light emitted from the lamp is directed to the document;

a dimmer circuit connected to the fluorescent lamp for adjusting an amount of light emitted from the lamp; and a mask arranged around the fluorescent lamp at least adjacent thereto and having light permeable openings whose aperture ratio is small at a central portion of the lamp tube and is larger at both end portions of the lamp tube.

2. An illuminating device according to claim 1 further comprising a mask arranged in front of the aperture of the fluorescent lamp and having light permeable openings whose aperture ratio is small at a central portion of the lamp tube and becomes larger at both end portions of the lamp tube.

3. An illuminating device according to claim 1, wherein: said mask is formed of a transparent sheet on which the openings are defined by printing, and the sheet is affixed around the outer surface of the lamp tube.

4. An illuminating device according to claim 1 wherein: said mask is formed by an opaque layer printed on the outer surface of the lamp tube.

5. An illuminating device according to claim 1, wherein: the mask is arranged in rotatable manner together with the lamp and the openings of the mask are so configurated that areas of those parts of the openings which are substantially opposed to the document are changed by rotating the mask to enable the light intensity at the document to be adjusted by rotating the mask.

6. An illuminating device according to claim 1, wherein: the mask is arranged in rotatable manner individually from the lamp about the longitudinal axis of the lamp tube and the openings of the mask are so configurated that areas of those parts of the openings which are substantially opposed to the document are changed by rotating the mask to enable the light intensity at the document to be adjusted by rotating the mask.

* * * * *